Nov. 9, 1948.　　　　　L. DUFOUR　　　　　2,453,417
STEERING MEANS FOR VEHICLES
Filed Jan. 10, 1945　　　　　　　　　　　　　　6 Sheets-Sheet 1

INVENTOR
LEON DUFOUR,
BY
ATTORNEY

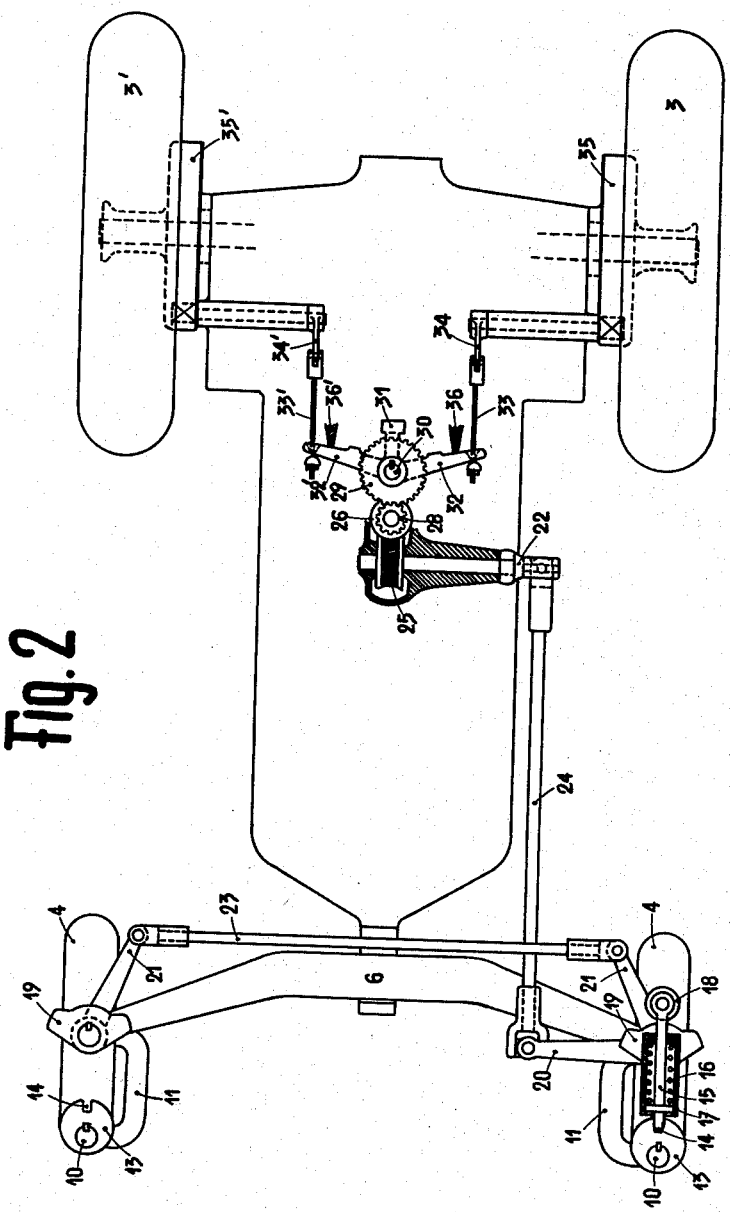

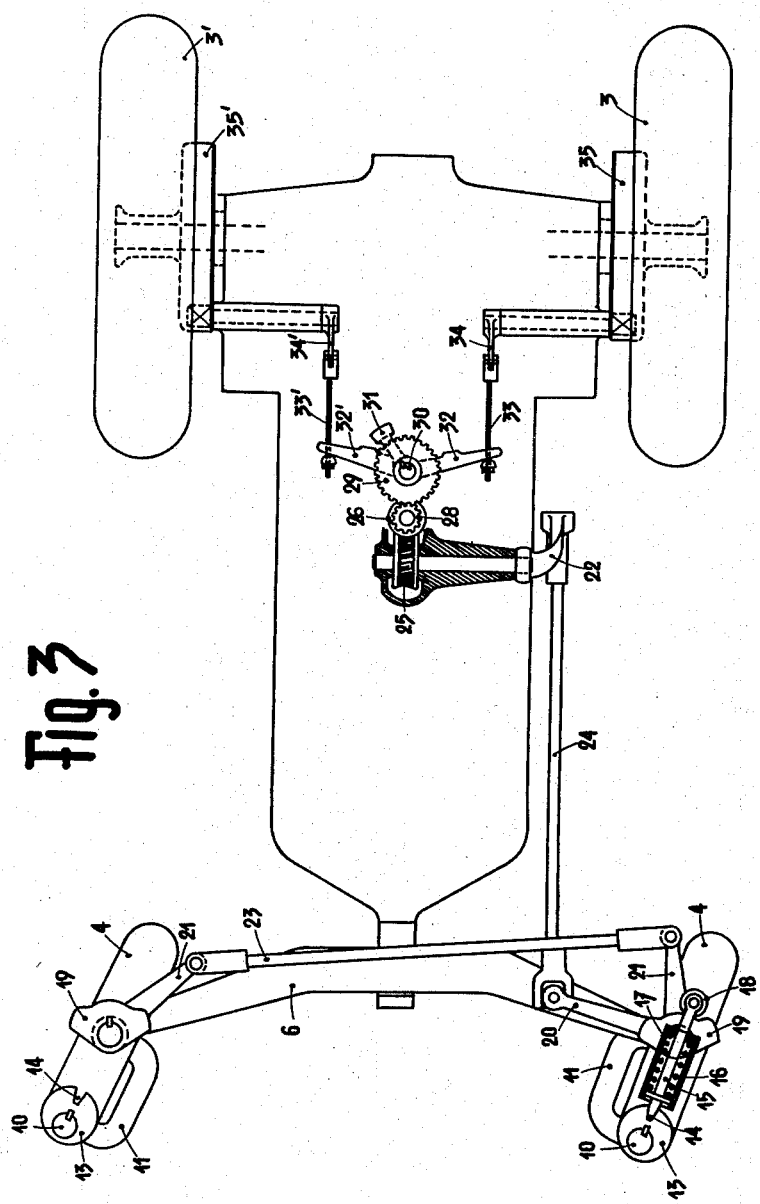

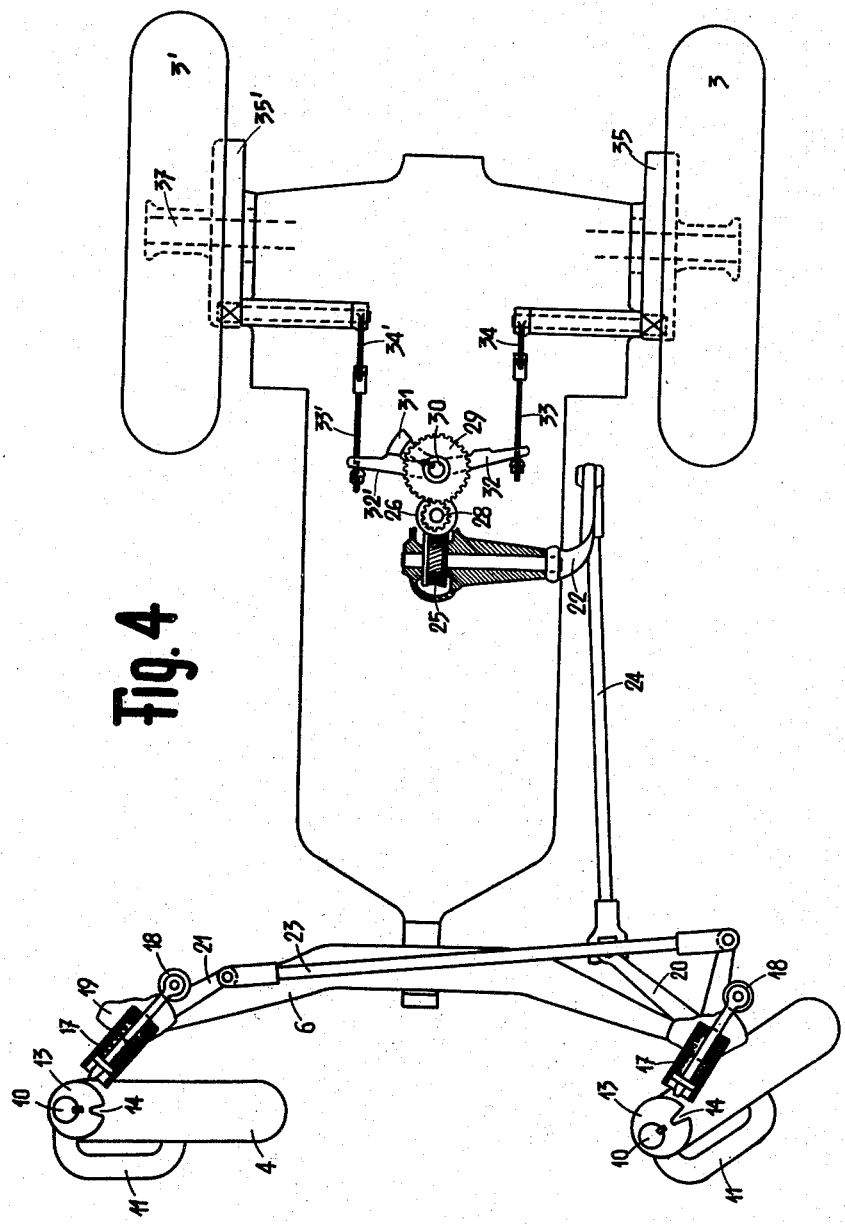

Nov. 9, 1948.                L. DUFOUR                2,453,417
                       STEERING MEANS FOR VEHICLES
Filed Jan. 10, 1945                              6 Sheets-Sheet 5
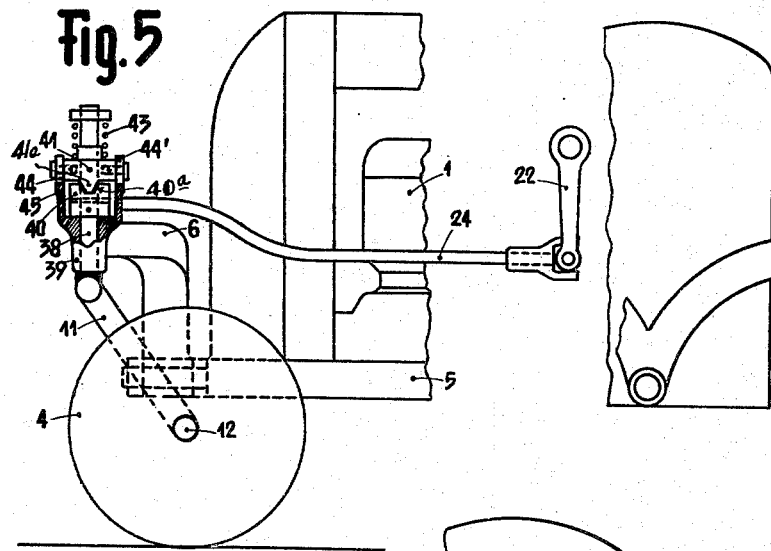
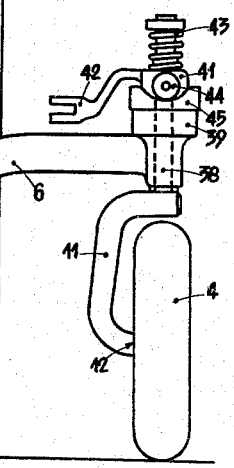
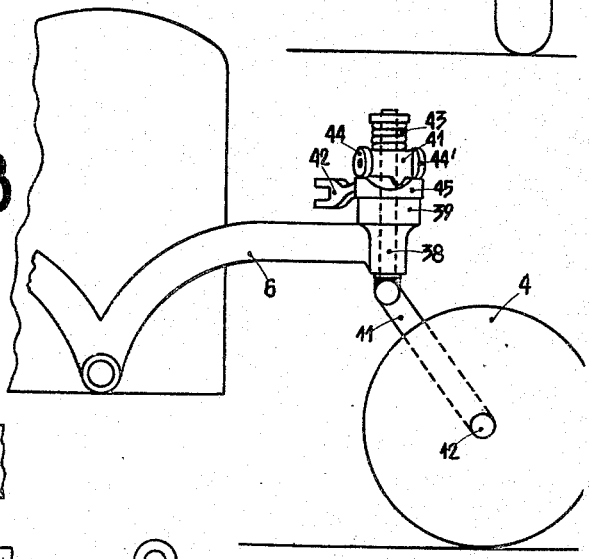
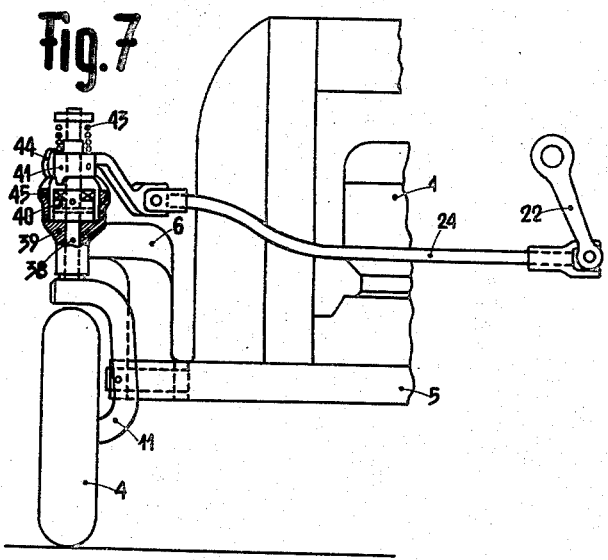
INVENTOR
LEON DUFOUR,
BY
ATTORNEY

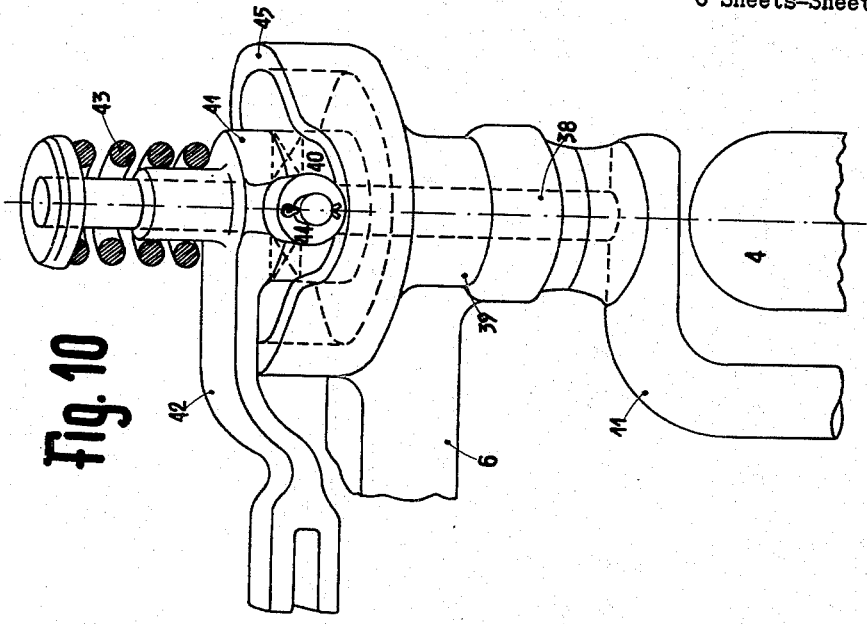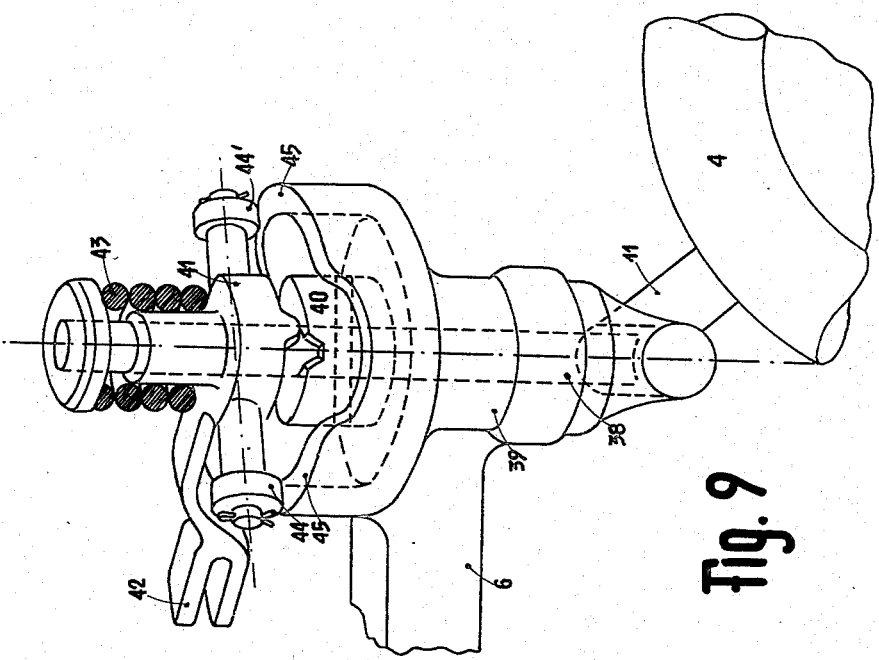

Patented Nov. 9, 1948

2,453,417

UNITED STATES PATENT OFFICE 2,453,417

STEERING MEANS FOR VEHICLES

Léon Dufour, Geneva, Switzerland

Application January 10, 1945, Serial No. 572,145
In Switzerland January 24, 1944

8 Claims. (Cl. 180—18)

This invention relates to an improvement in road vehicles, more especially agricultural tractors, and has particularly in view a novel steering mechanism which enables the operator to cause the vehicle to turn on a very short radius by freeing the front wheels from manual control and simultaneously and automatically causing the application of a brake to one of the drive wheels.

It has heretofore been proposed to reduce or shorten the turning radius of the front wheels of the vehicle by adopting various expedients, such, for example, as; by braking the driving wheel on the inner side of the turning radius while the front wheels are still under the control of the operator by the usual steering wheel; controlling the position of the front wheel or wheels through the aid of reversible gears, and disposing these wheels in such a position that they set themselves in the desired direction when a turn is to be made; and also to control the turning movement of the vehicle utilizing only the action of the brake on one of the driving wheels, the front wheels being of the completely free swivelling or castering type. However, the arrangements heretofore proposed have been open to various objections, chief among which are that the front wheels of the vehicle and their supporting axles are subjected to undue strains due to drag or impede true turning movement, or on the other hand, the operator of the vehicle has been required to give undue attention to manipulating the brake and the steering wheel, thus imposing unusual manual attention on the operator, which requires him to focus greater attention on the operation of the machine rather than on the work it performs.

Accordingly, a primary object of the present invention is to provide means exclusively under the control of the operator manipulated steering wheel which permits of steering the front wheels of the vehicle in their normal course, and then, when it is desired to turn, after the front wheels have described a predetermined arc, means automatically comes into play as the result of turning the steering wheel, simultaneously to apply the brake to one of the rear wheels and release the front wheels from the control of the steering means and thereby permit them to follow an arc described by the tractor under the braking effect on the inner driving wheel. Thus, the present invention enables the operator of a vehicle normally to drive forwardly, or, at will, describe wide, as well as short turns without having to concern himself with the operation or manipulation of means to obtain the desired directional movement, because, after the front wheels have moved through a predetermined angle, their connection with the steering means is automatically broken while the brake is applied to one of the rear drive wheels. In addition, the present invention permits an advantageous reduction of weight resting on the front axle because such weight can be so distributed as to relieve the front axle of a major portion of the strain imposed thereon due to drag or turning effort under the driving effect of the rear wheels, while, at the same time, enabling the rear driving wheels to obtain more effective traction in proportion to the load to be moved.

A further object of the invention is to provide relatively simple and practical means for accomplishing the objects above set forth, both from the standpoint of manufacture and assembly, as well as in actual use.

Preferred and practical embodiments of the invention are shown in the accompanying drawings wherein similar reference characters designate corresponding parts.

Figure 2 is a plan view of the tractor shown in Figure 1, with the latch and roller on the left front wheel shown in section, but omitted from the right front wheel for the sake of clearness.

Figure 3 is a plan view like Figure 2, but with the tractor having its front wheels turned at an angle of about 20° and with the latch and roller on the left front wheel shown in section, but omitted from the right front wheel for the sake of clearness.

Figure 4 is a diagrammatic plan view on the order of Figure 2, showing the relative position of parts when the tractor turns on its right rear wheel.

Fig. 5 is a partial side view in elevation of the front part of the tractor of the second example.

Fig. 6 is a front view in elevation of the part of the tractor shown in Fig. 5. These two figures show the tractor in position when running forward in a straight line.

Fig. 7 is again a partial side view in elevation of the front part of the tractor, and Fig. 8 is the front view in elevation of the part shown in Fig. 7. These two figures show the tractor in position of a short radius turning round the centre of its right-hand rear wheel.

Fig. 9 is a detailed perspective view showing the mechanism of control of the left-hand front wheel in its position of Fig. 8.

Fig. 10 is a detailed perspective view showing the same mechanism of control of the left hand front wheel, but in its position of Fig. 6.

Figure 1:
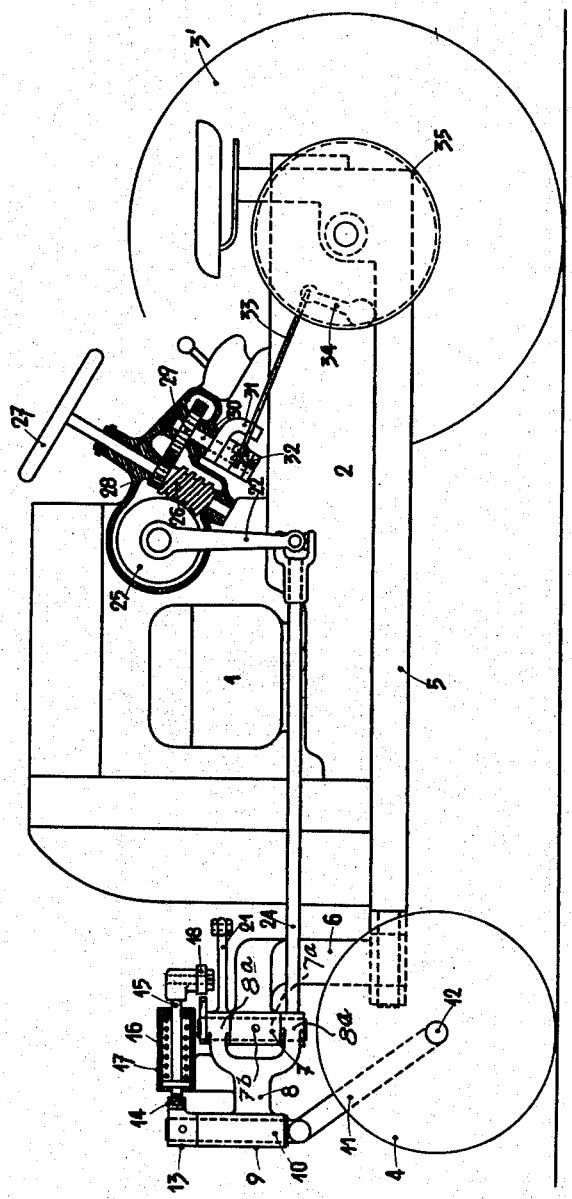
Figure 1 is a side elevation of a tractor of the first example, the rear left wheel being removed for greater clearness.

In the example of Figs. 1 to 4, 1 shows the motor, 2 the case containing the gear-box, the speed gears and the differential, 3 and 3' the driving rear wheels, 4 the front wheels, and 5 the chassis of the tractor.

As will be seen from Figs. 2 and 3, the front end of the chassis 5 is provided with a front axle 6 having at each end thereof a rigid knuckle member 7 which supports a pivot bolt 7a suitably keyed therein by the key 7b. A horizontal arm 8 having a bifurcated end portion 8a is adapted to swing about the upper and lower exposed ends of the pivot bolt 7a so as to be freely rotatable thereon. The end of the arm opposite the said bifurcated portion is provided with a vertically disposed sleeve 9. The arm 8 has been omitted in the plan views for the sake of clarity. A vertical shaft 10 is mounted in each sleeve 9 for free turning movement, and the lower end of each shaft 10 includes an oblique arm 11 whose lower end is provided with a horizontal axis 12 to support each front wheel.

A disk 13 having a keeper notch 14 is keyed to the upper end of the shaft 10, and said notch is adapted to releasably receive a latch bolt 15 which is pressed into the notch by a spring 16 confined in a spring barrel 17 which is rigidly mounted on and carried by the horizontal arm 8. The rear end of the bolt 15 is provided with a roller 18 which engages the front edge portion of a double cam 19 keyed or otherwise fixed to the upper end of the pivot bolt 7a, whereby when the arm 8 and latch bolt 15 revolve around the said bolt, the latch 15 will be actuated.

The two arms 8, left and right, are manually controlled by levers 20, 21 and 22 and connecting rods 23 and 24 (Fig. 2), and by the worm wheel 25 with worm screws 26, and the shaft of the steering wheel 27. It will thus be seen that the arms 8 are controlled by appropriate linkage from the steering wheel.

A toothed pinion 28 fixed to the shaft of the steering wheel engages a toothed wheel 29 fixed on secondary shaft 30. This secondary shaft has a rearwardly extending finger 21 which, after a predetermined arc of idle movement, may contact with either one of the levers 32 and 32'. These two levers are coaxially mounted for free pivotal movement about the secondary shaft 30, and their free ends control, through the medium of the rods 33 and 33' and levers 34 and 34', the action of the brakes 35 and 35', each corresponding to one of the rear wheels 3 and 3' of the tractor. Instead of being mounted on the wheels, these brakes could be mounted on the axles of the differential which are generally distinct from the axles of the rear wheels in agricultural tractors. When the finger 31 is not in contact with one of the levers 32, 32', the latter rest on fixed abutments 36, 36', which are schematically shown only on Fig. 2, and which permit to regulate easily the play of brakes 35, 35'.

In Figs. 2 and 3, when the latch bolts 15 rest in the notches 14 of the disks 13, the shafts 10 are locked in sleeves 9. It follows, thereupon, that upon each angular movement of horizontal arms 8, controlled in the usual manner by steering wheel 27, a similar angular movement of front wheels 4 takes place. These angular movements of the wheels are facilitated by the fact that knuckle members 7 of the front axle, round which arms 8 oscillate, are placed in the vertical plane of the point of contact of the wheels with the ground. Therefore the front wheels pivot on this point of contact without being subjected to a lateral sliding strain.

Referring further to Figs. 2 and 3, the latch bolts 15 with their barrel encased springs are shown only on the left front wheel of the vehicle, so that cam 19, which is rigid with the bolt 7a and knuckle 7, can be seen more clearly. As shown clearly in Fig. 3 for a turning angle of say 20°, the wheels 18 on the ends of the latch bolts 15 are not yet displaced by double cam 10, and consequently bolts 15 are still holding disks 13 which are fixed to the tops of vertical shafts 10. As will also be seen from Fig. 3, finger 31 is not yet in contact with lever 32' which controls brake 35'. But if the steering wheel is further turned to the right, the finger 31 will move from the position shown in Fig. 3 to the position shown in Fig. 4. The finger 31 then contacts with lever 32', and pushes this lever forward and presses on brake 35', which forces the tractor to pivot around the center 37 of the right rear wheel 3'. Then, this pivoting motion can be effected without any lateral sliding strain on the front wheels because the latter have become free at the same moment to automatically set themselves exactly to the required direction of turning-radius of the tractor. In fact, as soon as arms 8 have turned more than 30° for instance, cams 19 acting on wheels 18 of latch bolts 15 draw these bolts out of notches 14 of disks 13. Shafts 10 being unlatched can then turn freely in sleeves 9 of arms 8, which remain relatively fixed because they are controlled by the steering wheel, which at this point is held relatively fixed because of its indirect connection with the brake 35'. The front wheels will then swivel and set themselves in the desired direction because their axles 12 are connected by oblique arms 11 to vertical shafts 10, which are in a plane of rotation in front of them.

Thus, from the foregoing, it will be seen that the tractor will pivot round center 37 (Fig. 4) of its right-hand rear wheel with the greatest facility, and without the driver being even conscious that he is directing the turning by applying the brake on a rear wheel nor by the steering of the front wheels. The front wheels are subjected to no special strain although literally turning on the spot, and consequently it is possible to make these front wheels and their axle of comparatively light weight and yet sufficiently strong to insure their rotation through arcs of less than 30° or 35°, as proved in practice. Moreover, if the front wheels being turned should slide forward on a particularly slippery ground, it would be sufficient to turn the steering wheel a little more to obtain, by brake action on the rear wheel, the desired turning movement of the vehicle. In fact, by exerting lighter pressure on the steering wheel, it is possible to only slightly brake the rear wheel without stopping it and thus effect a turn of the desired smaller or larger radius. In addition to making short turns, the lightness of the front wheel assembly makes it possible to keep the greatest weight of the vehicle at the location of the rear wheels, where this weight is directly used for traction, i. e. for the useful tractive capacity of the tractor.

After turning has been accomplished and brake pressure on one rear wheel has been released, the forward motion of the vehicle will cause the front wheels to resume their parallel position relative to the rear wheels, and latch bolts 15 again engage disks 13 under the action of springs 16.

In Figs. 5 to 10, the same reference numbers apply to the same parts as in Figs. 1 to 4. Contrary to the arrangement of Figs. 1 to 4, the oblique arm 11, which is rigid with the vertical shaft 38, pivots directly in a knuckle portion 39 of the front axle. The vertical shaft 38 is here also placed in the plane of rotation of the front wheel, not above the contact point of that wheel with the ground, but slightly to the front of said point of contact, when the tractor is moving forward as in Fig. 5.

The upper end of the knuckle member 39 is cupped to receive the lower half 40 of the claw-clutch which is keyed to shaft 38. The other or upper half 41 of said clutch can turn round the upper part of shaft 38. For the simplification of the drawings, this claw-clutch is shown with two teeth 41a disposed 180° from one another, the lower half 40 of the clutch having notches 40a to receive said teeth. Part 41 of the clutch is controlled by a lever 42 which is pivoted to the end of connecting rod 24 controlled by the steering wheel. The upper part 41 of the clutch is constantly urged by a spring 43 toward part 40.

The engagement of 40a and 41a which is shown as accomplished in Figs. 5, 6 and 10, is only possible when wheels 44, 44', which are fixed to part 41 of the clutch, are opposite the valleys of a cam rigidly fixed to the knuckle portion 39. Note Figs. 5, 6 and 10. The valleys of cam 45 are large enough for the front wheels 4 to be turned left or right through a given angle, for instance 25° to 35°, to the right or left of its neutral forward running position, without the clutch being released. But, as the wheels 44 rise on the crests of the cam, as shown in Figs. 7, 8 and 9, the part 31 becomes disengaged from part 30 of the clutch. From that moment, the front wheel 4 becomes free to caster, as shown in Figs. 7 and 8, because pivot-shaft 38 becomes free in knuckle portion 39, having ceased to be controlled by lever 42 which is actuated by the steering wheel. After turning, the steering wheel having regained its early angular position as soon as the tractor has again started forward, the clutch parts resume normal interlocked position under the action of spring 43, and the position shown in Fig. 5 is re-established. The right front wheel has exactly the same arrangement as the left front wheel.

It will be understood that other mechanical latches or clutch devices may be provided for automatically interrupting the connection between the steering wheel and the front wheels as soon as the turning of the latter has reached a certain angle, since the two devices described herein are only shown by way of examples and not by way of limitation, within the scope of the appended claims.

Having now particularly described and ascertained the nature of my said invention and in what manner the same is to be performed, I declare that what I claim is:

1. Steering and braking means for vehicles of the type including, rear driving wheels, brake means therefor, a front axle, a steering wheel including a steering shaft, front wheels releasably connected through steering linkage with the steering wheel for normal straight ahead movement and wide turns, and automatic means for simultaneously braking one of the rear driving wheels when the front wheels are disconnected from the steering means, said automatic means comprising, a secondary shaft axially parallel with the steering shaft, gearing connecting said shafts, a pair of levers freely pivoted at their inner ends to the secondary shaft and having their outer ends connected to the brake means for each rear driving wheel, and a radial finger on the secondary shaft for engaging the rear edge of one of the said levers at a time between its point of pivotal support and its outer end to apply the brake on one drive wheel.

2. Steering and braking means for vehicles of the type including, rear drive wheels, brake means therefor, a front axle, a frame member rigid with each end of the axle, a pivot bolt rigid with each frame, an arm articulated to each bolt, a sleeve for each arm, a shaft adapted to turn in each sleeve, a front wheel connected to each shaft, retaining means on each shaft and arm for normally preventing its related shaft from turning, means rigid on said pivot bolt cooperating with a portion of said retaining means after the arm has been moved through a predetermined arc to release the retaining means and permit the shaft to freely swivel, a steering wheel, means for connecting the steering wheel with each of said arms, rods for actuating said brake means, a secondary shaft axially parallel with the axis of the steering wheel, a pair of levers pivoted at their inner ends on and adapted to move at right angles to said secondary shaft, means for loosely connecting the forward ends of said rods with the outer portions of said levers, a finger rigidly carried by and projecting rearwardly and radially from said secondary shaft, and gear means connecting said secondary shaft with the steering wheel, whereby, the turning of said steering wheel to a point where the finger engages a lever effects the actuation of one of the brake rods, and also the turning of the said steering wheel, through said means connecting it with said arms, simultaneously effecting release of the retaining means for the front wheels to permit them to caster.

3. Steering means for vehicles of the type including, rear driving wheels, brake means therefor, a steering wheel, a front axle, a frame member rigid with each end of the axle, a pivot bolt rigid with each frame and extending above and below said frame, an arm articulated to the portions of the bolt extending above and below the frame, a sleeve for each arm, a shaft adapted to turn in each sleeve, a front wheel connected to each shaft, retaining means on each shaft and arm for normally preventing its related shaft from turning; said retaining means comprising a disk rigid on the shaft and having a keeper notch, a spring pressed plunger-type latch carried by the arm and normally engaging said keeper notch of the disk, a roller mounted on a vertical axis carried by an angular portion of the plunger-type latch, a cam rigidly carried by the pivot bolt and adapted for engagement with said roller when the steering wheel has turned through a predetermined arc automatically to disengage the plunger-type latch from the keeper notch of the disk, and means operated by the steering wheel simultaneously with the release of the retaining means to apply the brake to one of the rear driving wheels of the vehicle.

4. Steering means for vehicles of the type including, rear driving wheels, brake means therefor, a steering wheel, a front axle, a wheel-carrying shaft vertically journalled at each end of the axle, and means for releasably holding each shaft to enable its related wheel to normally follow a straight path and describe turns, said means comprising a member having a notch and rigidly secured to each shaft, and a cup-like collar carried by the axle and having an upper cam track, a spring pressed member free to turn on each shaft and having a latch portion for engaging with the said keeper notch, radial arms carried by said spring pressed members, rollers at the outer ends of said arms adapted to travel on the cam track of said collar, means connecting said spring pressed member with the steering wheel, whereby, as the latter passes through a predetermined arc said spring pressed member will be lifted by the rollers traveling on the zenith portion of the cam track to remove the latch from the keeper means and thus free the wheel-carrying shaft for swivelling movement, and means under the control of the steering wheel for actuating the brake means for one of the rear driving wheels simultaneously with the release of the wheel-carrying shaft by the said retaining means.

5. In a vehicle such as a tractor or the like, the combination including, a steering wheel, rear driving wheels, brake means for each rear wheel, front wheels, mounting means for each front wheel, releasable means effective during straight ahead travel and within a predetermined angle of deviation from said travel for subjecting said mounting means to the control of said steering wheel, means operable upon said deviation from straight ahead travel exceeding said predetermined angle to release said mounting means from the control of said steering wheel, and means operable simultaneously with the operation of said releasing means for actuating the brake means of the rear wheel on the side toward which the front wheels are turned.

6. Steering and braking mechanism for vehicles of the type including, rear driving wheels, brake means for each of said rear wheels, a front axle, front wheels, mounting means for said front wheels pivotally supported by said front axle, a steering wheel, means releasably connecting said wheel mounting means to said steering wheel during straight ahead travel and within a predetermined angle of deviation from said travel, means for releasing said connecting means and operable upon said deviation exceeding said predetermined angle, and means for actuating the brake of the rear wheel on the side toward which the front wheels are turned, said means being operable by said steering wheel simultaneously with the operation of the releasing means.

7. Steering and braking mechanism for vehicles of the type including rear driving wheels, brake means for each of said rear wheels, a front axle, front wheels, a steering wheel, mounting means for said front wheels pivotally supported by said front axle and each including a disk having a notch, spring pressed latch means each for engaging a notch and subjecting said wheel mounting means to the control of said steering wheel during straight ahead travel and within a predetermined angle of deviation from said travel, means rendered operative upon said deviation exceeding said angle for disengaging said latch means from said notches, and means rendered operative by said steering wheel upon the disengagement of said latch means from said notches for actuating the brake for the rear wheel on the side toward which the front wheels are turned.

8. Steering and braking mechanism for vehicles of the type including rear driving wheels, brake means for each of said rear wheels, a steering wheel, a front axle, vertical shafts each carrying a front wheel and supported at an end of said axle for turning movement, spring pressed latch means each coacting with a shaft and holding same during straight ahead travel or turning same within a predetermined angle of deviation from said travel, means controlled by said steering wheel to release said latch means from said shaft upon said deviation exceeding said angle and thus free each wheel-carrying shaft to swivel, and means controlled by said steering wheel to actuate the brake to one of said driving wheels upon release of said latch means from said shafts.

LÉON DUFOUR.

REFERENCES CITED

The following references are of record in the file of this patent:

UNITED STATES PATENTS

| Number | Name | Date |
| --- | --- | --- |
| 1,476,068 | Froelich | Dec. 4, 1923 |
| 1,512,510 | Traphagen | Oct. 21, 1924 |
| 1,980,033 | Brown | Nov. 6, 1934 |
| 2,031,317 | Johnston | Feb. 18, 1936 |